Figure 1:
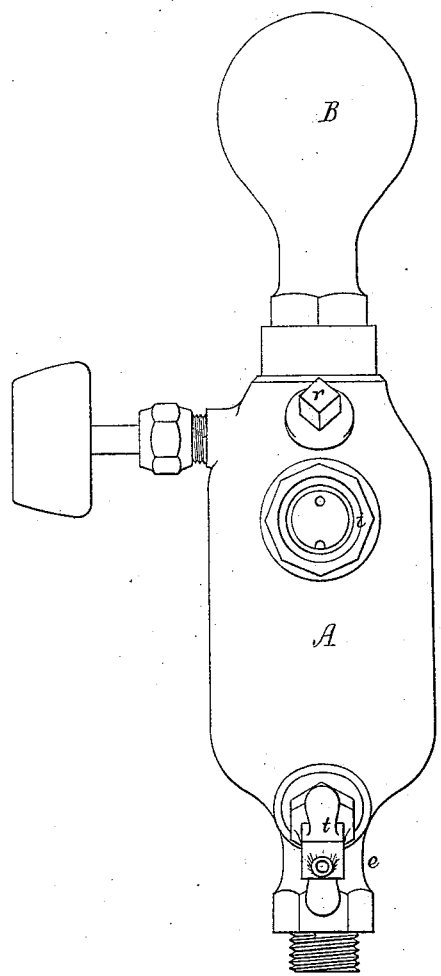

(No Model.)  2 Sheets—Sheet 1.

W. H. CRAIG.
LUBRICATOR FOR STEAM ENGINES.

No. 291,696. Patented Jan. 8, 1884.

Witnesses.
S. N. Piper
E. B. Pratt

Inventor.
Warren Hilliard Craig.
by R. H. Eddy atty.

(No Model.) 2 Sheets—Sheet 2.
W. H. CRAIG.
LUBRICATOR FOR STEAM ENGINES.
No. 291,696. Patented Jan. 8, 1884.
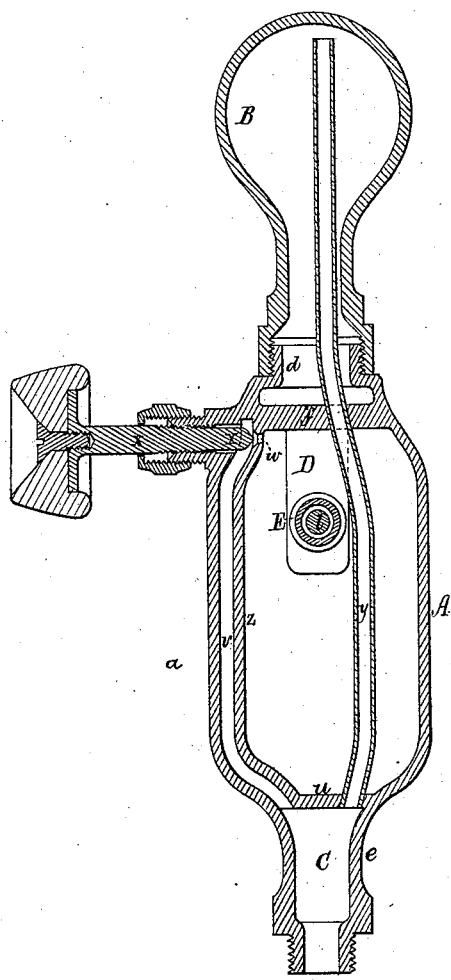
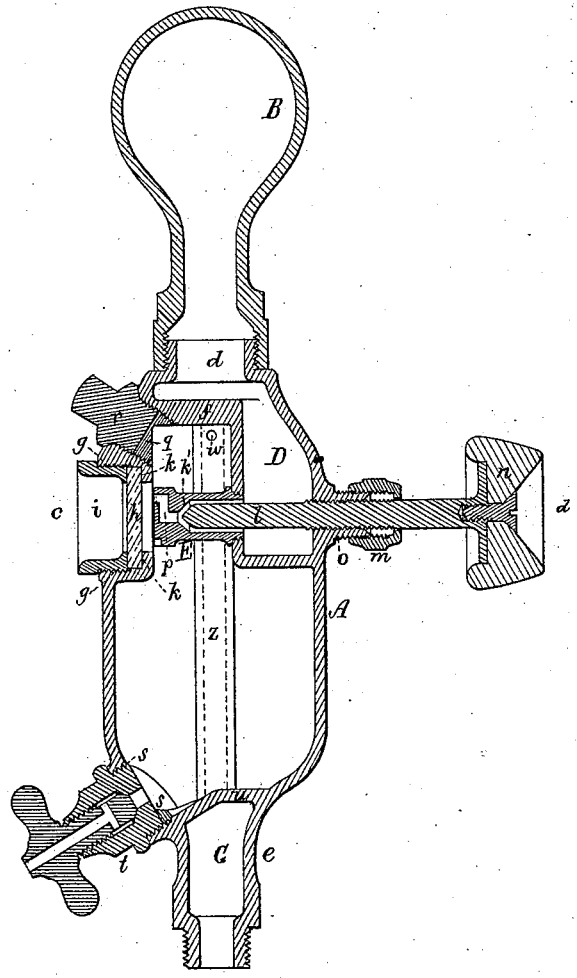
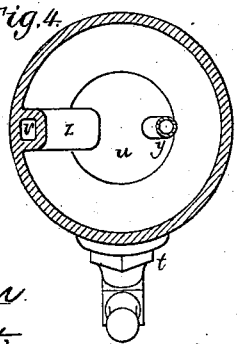
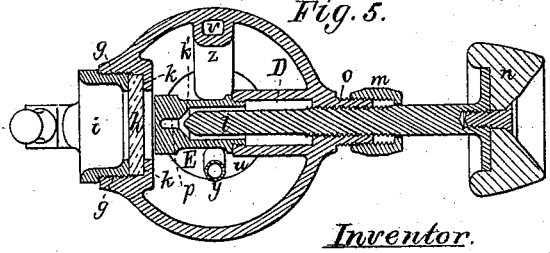
Witnesses.
S. N. Piper
E. B. Pratt
Inventor.
Warren Hilliard Craig.
by R. H. Eddy att'y

United States Patent Office.

WARREN HILLIARD CRAIG, OF LAWRENCE, MASSACHUSETTS.

LUBRICATOR FOR STEAM-ENGINES.

SPECIFICATION forming part of Letters Patent No. 291,696, dated January 8, 1884.

Application filed October 24, 1883. (No model.)

*To all whom it may concern:*

Be it known that I, WARREN HILLIARD CRAIG, of Lawrence, in the county of Essex, of the Commonwealth of Massachusetts, have invented a new and useful Improvement in Lubricators for Steam-Engines; and I do hereby declare the same to be described in the following specification and represented in the accompanying drawings, of which—

Figure 1 is a side elevation of a lubricator containing my invention, the nature of which is defined in the claims hereinafter presented. Figs. 2 and and 3 are vertical and axial sections of it, the plane of section of one being at right angles with that of the other. Fig. 4 is a transverse section of the oil-reservoir through the line $a\ b$ of Fig. 2. Fig. 5 is another transverse section of the oil-reservoir, taken through the line $c\ d$ of Fig. 3.

In such drawings, A denotes the said oil-reservoir, while B is the condenser, arranged above such reservoir. There are two necks, $d$ and $e$, to such oil-reservoir, one being at its upper and the other at its lower part, as represented, both necks being open and tubular. On the upper neck is screwed the condenser B, which opens directly into the said neck. Furthermore, the neck $d$ opens into a water trap or chamber, D, formed within the body of the oil-reservoir, and extending downward in such from its top $f$ and against one side of the reservoir in manner as shown in Figs. 2 and 3. Directly in front of the trap D there is in the opposite side of the reservoir a mouth, $g$, provided with a glass pane, $h$, held in place by an annulus, $i$, screwed into the mouth, so as to force the pane closely against an annular chamber, $k$, formed in the mouth. The said mouth opens into the reservoir and directly in front of the polished end of an educt, E, provided with a valve-seat, $k'$, and screwed into and projecting from the trap D in manner as represented in Fig. 3. There is within the educt E and to its seat $k'$ a plug, $l$, which is provided with a knob, $n$, and extends through a stuffing-box, $m$, and the trap D, and screws into a tubular projection, $o$, formed upon one side of the reservoir, all being as represented. Opening out of the valve-seat and the closed end of the educt E is a Z-shaped passage, $p$, arranged as shown. Furthermore, there is in the upper part of the oil-reservoir and over the mouth $g$ an auxiliary mouth, $q$, provided with a screw-plug, $r$, such mouth being for the supplying of the reservoir with oil, as occasion may require, the oil being introduced through the mouth into the reservoir. There is also to the reservoir, at its lower part, a third mouth, $s$, provided with a suitable cock, $t$, for discharge of the contents of the reservoir. There is also in the neck $e$, and beneath the bottom $u$ of the reservoir, a chamber, C, for reception of steam, such chamber, by means of the neck, being to communicate directly with the valve-chest of the engine, or with a conduit leading steam thereto. There leads out of the chamber C and up within the oil-reservoir, at one side thereof, a passage, $v$, which at its upper part opens into that of the oil-reservoir, the opening $w$ being provided with a screw-plug, $x$, for closing it, all being as shown. Besides the passage $v$, there leads out of or communicates directly or indirectly with the chamber C a pipe, $y$, which extends up within the condenser in manner as represented. The passage or duct $v$ is formed in a projection, $z$, cast in one piece with the body of the reservoir, and arranged therewith as represented.

In the above-described lubricator the steam, after entering the chamber C, passes by the pipe $y$ into the condenser B, and there and in the trap D becomes condensed. The plug $l$ being off the seat $k'$, the water produced by such condensation of the steam will flow through the part or educt E and down between it and the glass pane $h$ and thence into the oil-reservoir and through and below its charge of oil. If the plug $x$ is off its seat in the opening $w$, oil by the said water and the pressure of the steam will be drawn out of the reservoir through the opening $w$, and thence down through the passage $v$ into the steam-chamber C, from whence it will pass into the valve-chest or other part of the engine with which such chamber may communicate.

As the water may be delivered through the Z-shaped passage $p$, and may pass down in rear of the glass pane $h$, it can be observed by a person looking through such pane, the amount of water so escaping into the oil-reservoir serving to indicate the amount of oil driven out of it into the chamber C. The said amount of water may be regulated by means of the plug $l$ and valve-seat $k'$.

By having the trap D and mouth $g$ arranged within the oil-reservoir and with respect to each other in manner as above described, and as represented in Fig. 3, the educt E can readily be introduced through the mouth $g$ and fixed in place in the trap while the pane $h$ is out of the mouth. By having the passage $v$ within the body of the oil-reservoir and formed in a projection, $z$, integral with such body, the latter becomes excluded from view, and the opening $w$ and the plug $x$ can be arranged, as shown, in the upper part of the reservoir.

The above-described lubricator differs from various others of the kind in use in having the trap D, the observation-port, the educt E, and the passage $v$ within the oil-reservoir, and also having to such reservoir the steam-chamber beneath it and opening into the passage $v$, all of which, while cheapening the cost of construction of the lubricator, renders it specially advantageous in its operation, comparatively speaking.

What I claim in the above-described steam-engine lubricator is as follows, viz:

1. The oil-reservoir having in and forming an integral part of it the projection $z$, provided with the passage $v$, leading from its upper part and down one side of it to its bottom and to open into the neck $e$, all being substantially as set forth.

2. The oil-reservoir provided with the steam-receiving chamber arranged in its lower neck and separate from the oil-receiving space of said reservoir, and also with a pipe leading up through the said reservoir into the condenser and opening out of or communicating with such chamber, all being substantially as set forth.

3. The oil-reservoir provided with the water-trap and observation-mouth, and its glass pane arranged, as represented, in the upper part of such oil-reservoir, in combination with the separate educt of the water-trap, arranged with the trap and pane, and having a valve-seat and plug, all substantially as specified.

4. The oil-reservoir provided with the steam-chamber in its lower neck, and with the oil-discharge passage leading into such from the upper part of such reservoir, and also with the pipe to extend up within the condenser and communicate with the said steam-chamber, all being substantially as described or represented.

WARREN HILLIARD CRAIG.

Witnesses:
R. H. EDDY,
E. B. PRATT.